United States Patent
Berg et al.

(10) Patent No.: US 7,410,022 B1
(45) Date of Patent: Aug. 12, 2008

(54) FUEL PICKUP RETURN LINE AND SEPARATOR

(75) Inventors: Jeffrey J. Berg, Warroad, MN (US); Douglas M. Corneliusen, Warroad, MN (US); Scott E. McKinster, Salol, MN (US)

(73) Assignee: Polaris Industries Inc., Medina, MN (US)

( * ) Notice: Subject to any disclaimer, the term of this patent is extended or adjusted under 35 U.S.C. 154(b) by 382 days.

(21) Appl. No.: 10/984,120

(22) Filed: Nov. 9, 2004

Related U.S. Application Data

(60) Provisional application No. 60/572,818, filed on May 20, 2004.

(51) Int. Cl.
*B62M 27/02* (2006.01)
*F02M 37/04* (2006.01)

(52) U.S. Cl. .............. 180/190; 180/182; 123/509; 123/510; 123/514

(58) Field of Classification Search .............. 180/182, 180/190; 123/509, 510, 511, 514, 516
See application file for complete search history.

(56) References Cited

U.S. PATENT DOCUMENTS

| | | | |
|---|---|---|---|
| 4,288,086 A | 9/1981 | Oban et al. | 280/5 |
| 6,216,809 B1 * | 4/2001 | Etou et al. | 180/68.3 |
| 6,575,145 B2 * | 6/2003 | Takahashi | 123/519 |
| 6,626,155 B1 * | 9/2003 | Ueda et al. | 123/509 |
| 6,857,419 B1 * | 2/2005 | Harvey et al. | 123/509 |
| 6,932,061 B2 * | 8/2005 | Tsuruta | 123/514 |

* cited by examiner

*Primary Examiner*—Lesleyb D. Morris
*Assistant Examiner*—Marc A Scharich
(74) *Attorney, Agent, or Firm*—Baker & Daniels LLP

(57) ABSTRACT

Systems, methods, and assemblies for providing improved fuel management to fuel injected engine systems of off-road vehicles, such as snowmobiles, personal watercraft, motorcycles, utility vehicles, and all-terrain vehicles. The fuel-injected engine systems can return fuel after passing through a pressure regulator located either upstream or downstream of the engine. Fuel may be returned to the fuel pump through various routes, rather than simply returning the fuel into the fuel of the fuel tank. Fuel may be returned directly to the fuel pump upstream of all fuel pickups or upstream of some fuel pickups and downstream from other fuel pickups. Some embodiments include a vapor separator located downstream of the pressure regulator but somewhere upstream of the fuel pump.

30 Claims, 18 Drawing Sheets

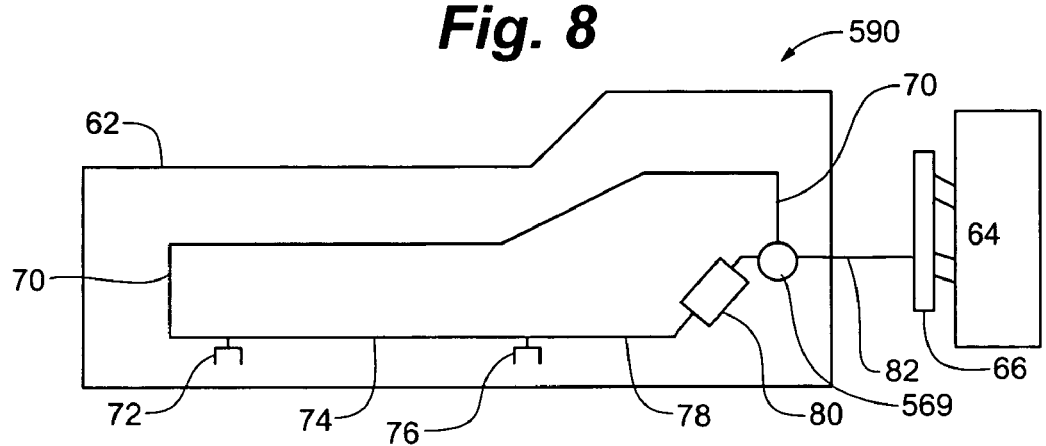
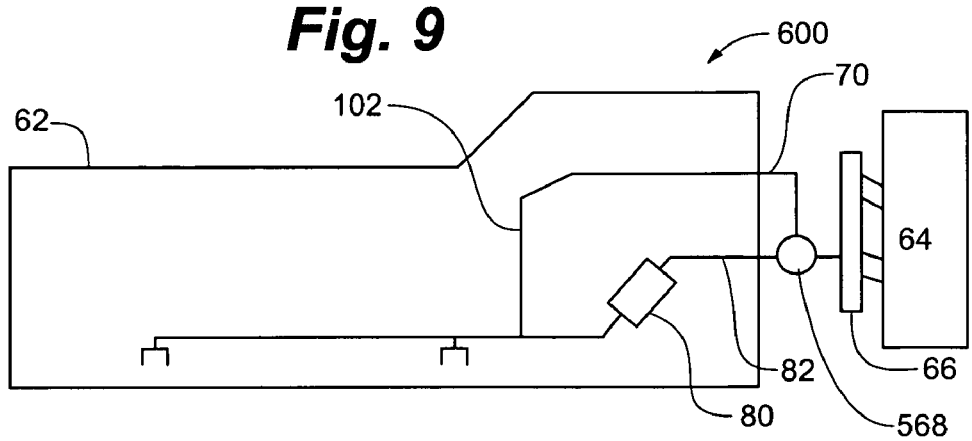

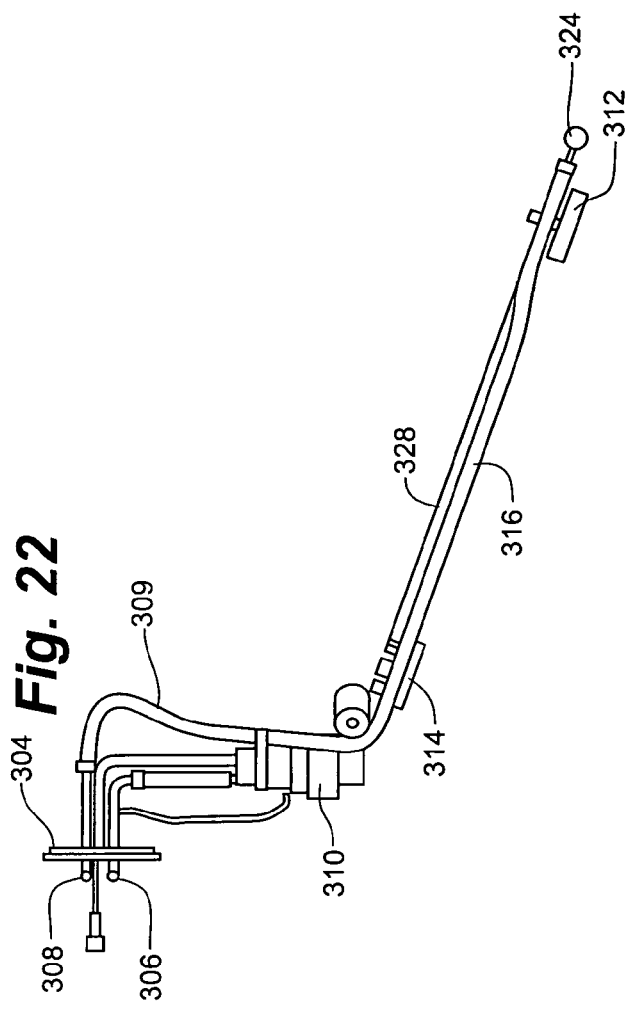
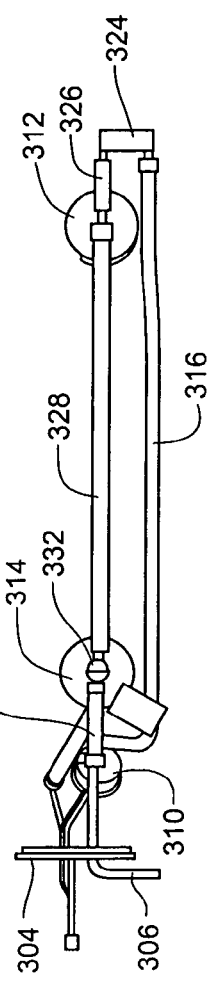
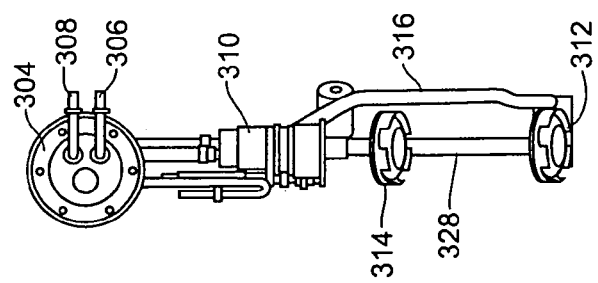

FUEL PICKUP RETURN LINE AND SEPARATOR

RELATED APPLICATIONS

The present application claims priority to provisional U.S. Patent Application No. 60/572,818, filed May 20, 2004, titled FUEL PICKUP RETURN LINE AND SEPARATOR, and herein incorporated by reference.

FIELD

Certain embodiments in this disclosure relate to powered vehicles and more particularly to snowmobiles, all-terrain vehicles, personal watercraft, utility vehicles and motorcycles, having fuel injected engines.

BACKGROUND

Fuel injected engines may be fed fuel under pressure by a fuel pump supplied from one or more fuel pickups in a fuel tank. "Returning fuel" systems have a pressure regulator located downstream of the fuel rail, for maintaining the pressure of fuel and for returning the uninjected fuel to the fuel tank. "Dead head" systems have a pressure regulator located upstream of the fuel injectors, for maintaining the fuel pressure and returning fuel pumped by the fuel pump but not sent to the fuel injectors. Off road vehicles, such as snowmobiles, personal watercraft, motorcycles, utility vehicles (for example, the Polaris Ranger), and all-terrain vehicles, have design challenges due to their intended use. Fuel tanks may often be tilted sideways, or front to back, as the vehicle traverses steep and/or bumpy terrain. Fuel is supplied to the fuel pump from a fuel pickup often disposed in the bottom of the fuel tank. When the fuel tank is partially empty and the fuel tank tilts, the fuel pickup may end up pulling in air and killing the engine, even though there is fuel at another location in the tank.

This has been addressed by adding a second fuel pickup elsewhere in the tank. This leaves the problem of one fuel pickup still sucking in air and causing the engine the sputter. This problem has been addressed by modifying the fuel pickups to close in the presence of air. This may prevent entry of some air, as the fuel pump pulls in fuel from a second pickup and none from the first, closed pickup. In some situations, both pickups may momentarily shut in the presence of air. In some situations, the fuel pump may pull a substantial vacuum, which keeps the fuel pickup in the closed position, even when the fuel pickup is once again covered with fuel. This can cause the engine to sputter or die.

In one example, in a half full fuel tank having two fuel pickups, one pickup may be exposed to air and closed for long periods. The other pickup may be exposed to fuel for long periods, and then exposed to air for a short period, as when a snowmobile goes downhill, exposing a rear, lower fuel pickup to air as the fuel shifts forward to cover the long closed, forward, upper fuel pickup. The fuel pump may pull a substantial vacuum against the front pickup, preventing it from opening, even in the presence of fuel. The engine can be starved for fuel, and miss and sputter, before being supplied fuel and recovering.

What would be desirable are systems to provide the engine with fuel even when the fuel tank is partially empty and the tank is tilted or bypassed.

SUMMARY

Some embodiments of the invention provide a system for providing fuel to an off-road vehicle having a fuel-injected engine. The system can include a fuel tank, at least one fuel pickup disposed in the fuel tank, a fuel pump coupled to the fuel pickup, and a fuel supply line coupled between the fuel pump and engine. The pump may be located either inside or outside the tank. A fuel injector can be coupled to the fuel supply line, and a fuel return line can be in fluid communication with the fuel injector for returning fuel. The fuel return line can be in fluid communication with the fuel pump to recycle returned fuel to the fuel pump. As used herein, the "fuel return line" returns fuel from the fuel injectors to the fuel pump, may exist in several sections, and may include a pressure regulator to control fuel pressure in the fuel rail, and located downstream of the fuel rail. The pressure regulator may be located upstream or downstream of the fuel injector. In some systems, a first fuel pickup supplies the fuel pump, and the fuel return line is coupled downstream of the first fuel pickup and upstream of the fuel pump, or upstream of the one and only fuel pickup. In various systems, having a second fuel pickup disposed upstream of the first fuel pickup, the return line can be coupled upstream of the second pickup, or coupled in-between the first and second pickups, or again coupled directly upstream of the fuel pump.

In some systems, a vapor separator is interposed in the fuel return line, somewhere between the pressure regulator, and the fuel pump. In various systems, the vapor separator is located external to the fuel tank, within the fuel tank but directly upstream of a first fuel pickup, within the fuel tank and between a first and a second pickup, or within the fuel tank and located downstream of one or more fuel pickups but upstream of the fuel pump. Systems may have only one fuel pickup, with the vapor separator located either upstream or downstream of the only fuel pickup. Some systems have fuel pickups adapted to close in the presence of air and open in the presence of liquid fuel.

Assemblies and subassemblies for providing fuel and accepting returned fuel as described above are also within the scope of the invention. Similarly, snowmobiles, all-terrain vehicles, motorcycles, utility vehicles, and personal watercraft including the above-described fuel systems are within the scope of the invention.

The invention, in some embodiments, provides a method for providing fuel to a fuel-injected, off-road vehicle. The method can include drawing the fuel from at least one fuel pickup in a fuel tank of the vehicle, and using a fuel pump to supply at least one fuel injector in an engine in the vehicle. The method can further include returning fuel that is not injected, and feeding the returned fuel through tubing to an intake of the fuel pump. The returning fuel can pass through a pressure regulator, which may reduce the fuel pressure. In some methods, the feeding includes feeding the fuel downstream of all fuel pickups and upstream of the fuel pump. In various methods, the feeding includes feeding the fuel upstream of both the pickups and the fuel pump. In some methods, the method includes feeding the fuel upstream of one pickup and downstream of another pickup. Various methods may include separating at least some of the returning fuel vapor from the returning fuel and removing it from the fuel being returned through the tubing to the fuel pump. The vapor separating may be performed either inside or outside of the fuel tank, depending on the embodiment.

Various embodiments of the invention can provide continuous fuel pressure even in conditions that could otherwise cause engines to sputter or even die. In one use of one embodiment of the invention, fuel is provided upstream of a fuel pickup, providing fuel pressure to the pickup even in a situation where the fuel pickup is closed in the presence of air. This can reduce the amount of vacuum on the mechanism which closed the fuel pickup in the presence of air, making it easier for the mechanism to open in the presence of fuel, rather than staying closed in the presence of a high vacuum applied by the fuel pump. In another use of one embodiment of the invention, a vapor separator can remove vapor from the returning fuel going ultimately to the fuel pump. When the fuel pump is calling for more fuel than the fuel pickups located upstream can immediately deliver, the relative lack of vapor in the fuel can make it more difficult for the pump to vapor lock in response to this temporary mismatch of supply and demand.

DRAWINGS

FIG. 8 is a highly diagrammatic view of another dead head fuel system having the pressure regulator within the fuel tank and having the fuel return line feeding the second of two fuel pickups in line with the fuel pump;

FIG. 9 is a highly diagrammatic view of yet another dead head fuel system having the fuel return line feeding a location upstream of the fuel pump but downstream of the first fuel pickup upstream of the fuel pump;

FIG. 22 is a side, perspective view of a fuel supply and return system that can be used in the fuel tank of FIG. 20;

FIG. 23 is a top view of the fuel supply and return system of FIG. 22;

FIG. 24 is a front, end view of the fuel supply and return system of FIG. 22;

DESCRIPTION OF VARIOUS EMBODIMENTS

Figure 1A:
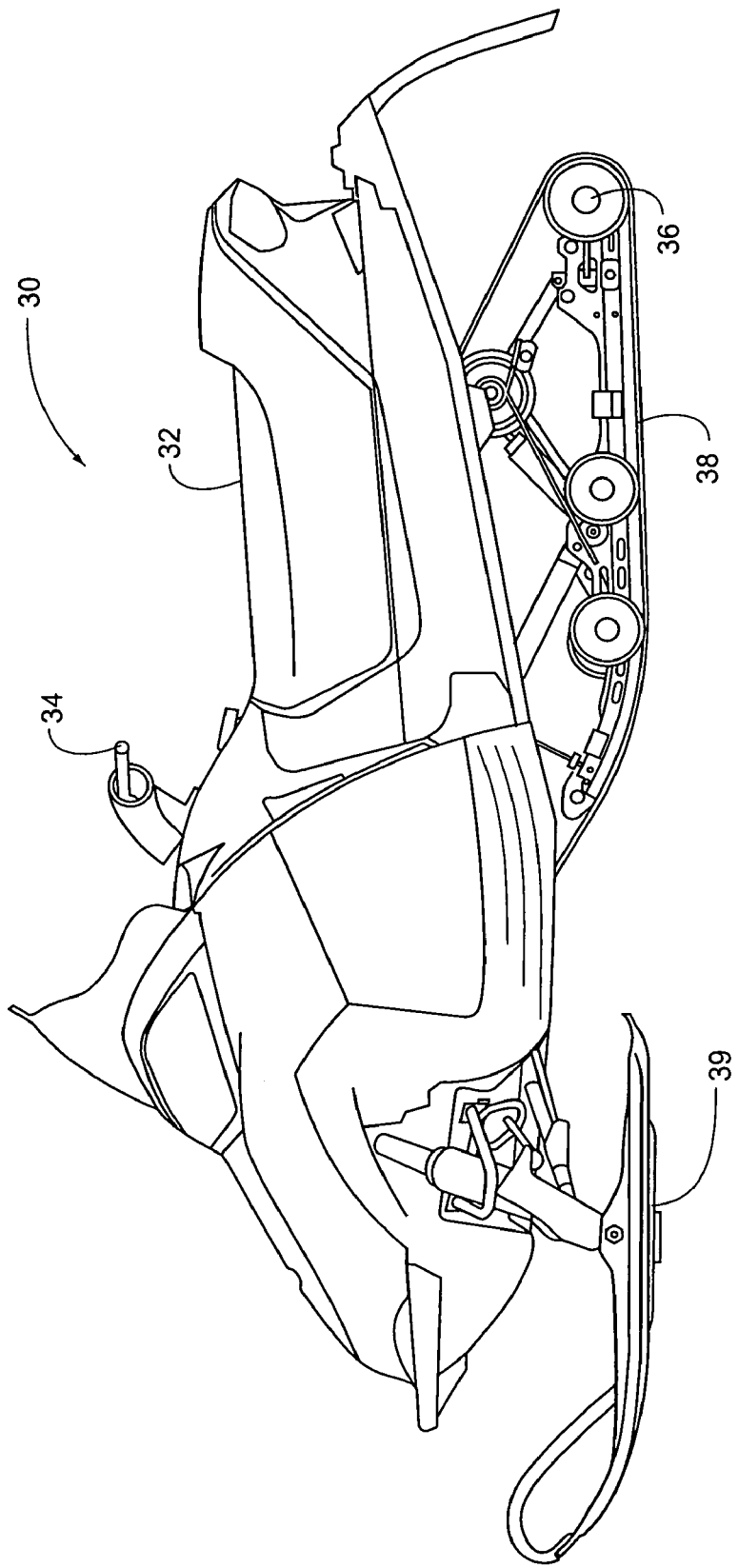
FIG. 1A shows a perspective view of a snowmobile that can incorporate some embodiments of the invention.

FIG. 1A depicts a snowmobile of certain embodiments of the invention. The snowmobile includes skis 39 and a straddle type seat 32 mounted to the chassis and a pair of handlebars 34 carried by the chassis adjacent to the seat 32 so that a rider sitting in straddle fashion on the seat may steer the snowmobile using the handlebars 34. The snowmobile includes an endless track 38 carried by a rear suspension system 36 mounted to the chassis, the endless track being connected to and powered by the snowmobile's engine (typically located beneath the hood near the front of the snowmobile). A fuel tank may be located partially or totally under seat 32 or located elsewhere.

Figure 1B:
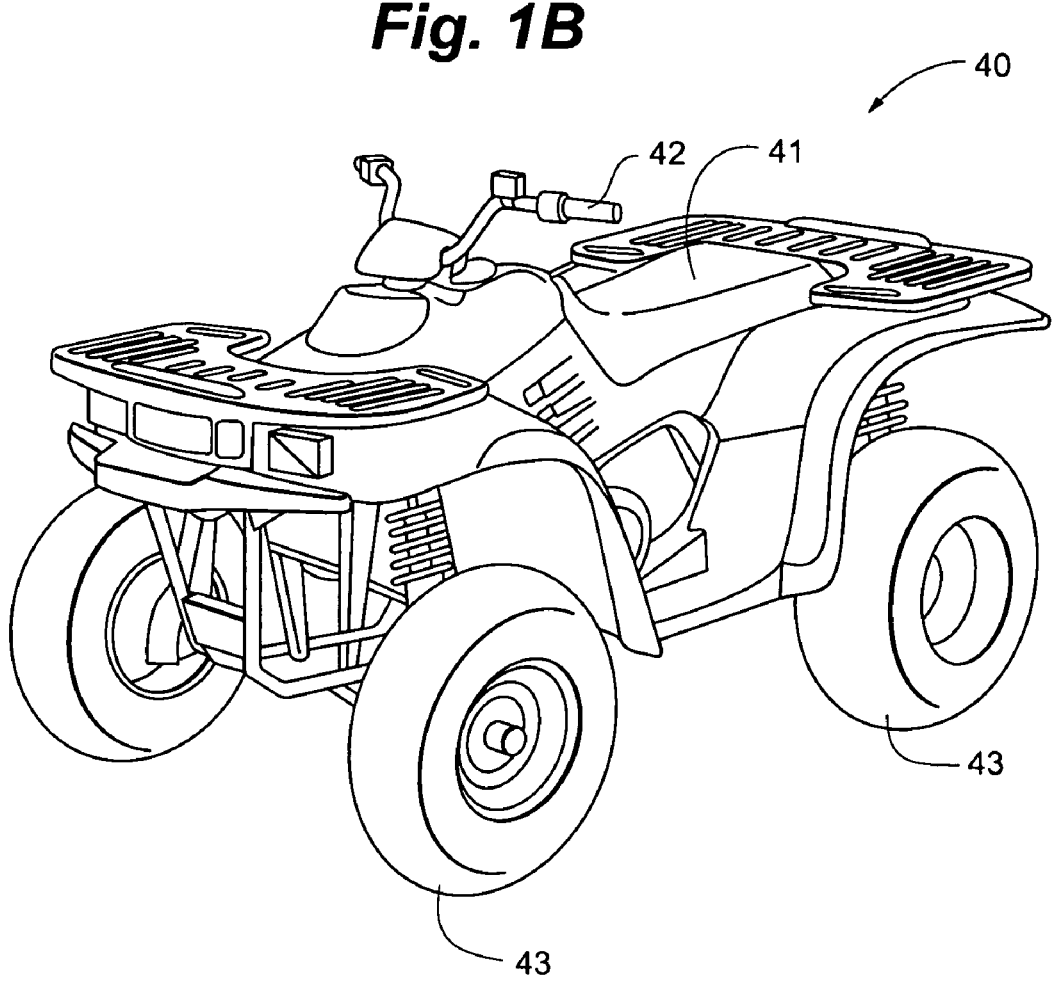
FIG. 1B shows a perspective view of an ATV that can incorporate some embodiments of the invention.

FIG. 1B depicts an all terrain vehicle (ATV) 40 having a straddle type seat 41. ATV 40 includes handlebars 42 for steering and wheels 43. A fuel tank may be located under or near seat 41.

Figure 1C:
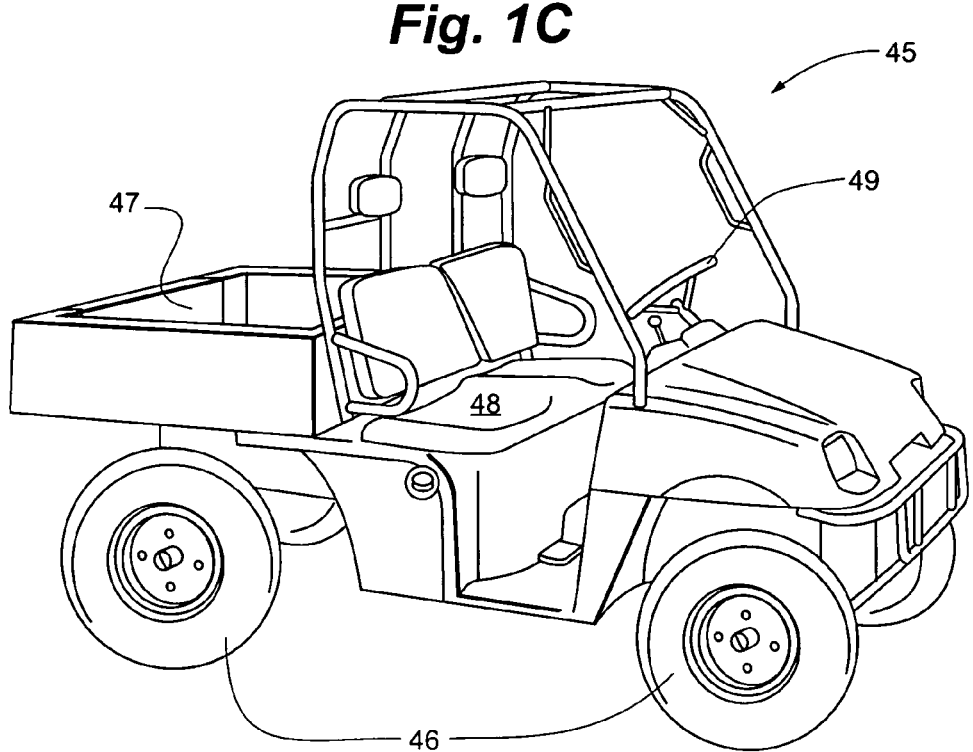
FIG. 1C shows a perspective view of an all terrain utility vehicle that can incorporate some embodiments of the invention.

FIG. 1C depicts a utility type all terrain vehicle (ATV) 45 having a bench or bucket type seat 48. Utility ATV 45 includes a steering wheel 49 for steering, a bed 47 for carrying material, and wheels 46. A fuel tank may be located under or near seat 48.

Figure 1D:
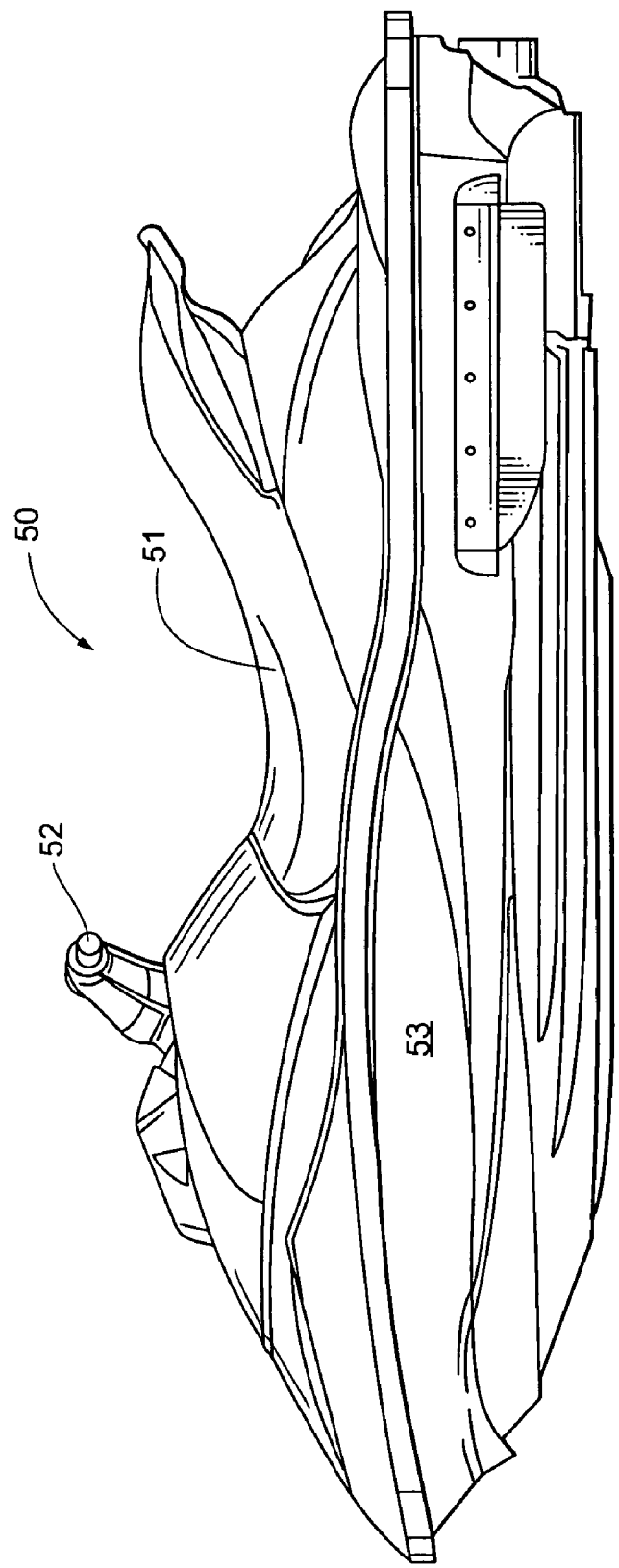
FIG. 1D shows a perspective view of a personal watercraft that can incorporate some embodiments of the invention.

FIG. 1D depicts a personal watercraft (PWC) 50 having a straddle type seat 51. PWC 50 includes handlebars 52 for steering and hull 53. A fuel tank may be located inside hull 53.

Figure 2:
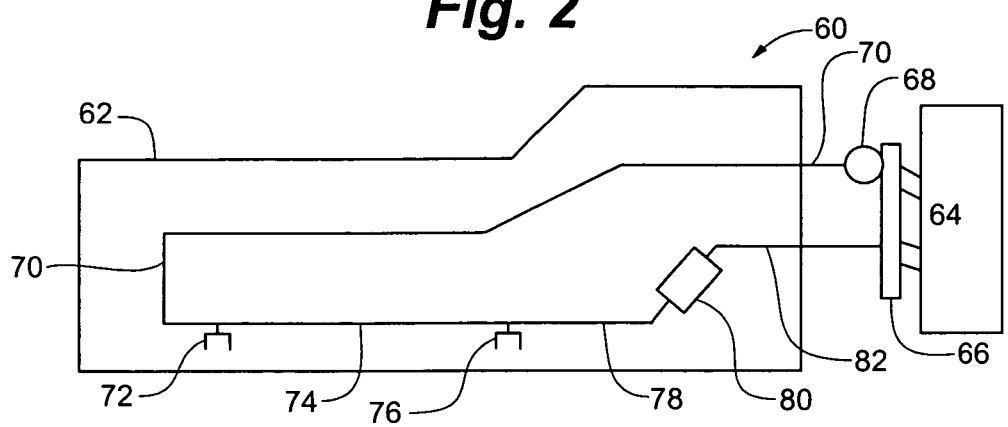
FIG. 2 is a highly diagrammatic view of one returning fuel system, having a pressure regulator external to the fuel tank and a fuel return line feeding the second of two fuel pickups in line with the fuel pump.

FIG. 2 is a highly diagrammatic view of one returning fuel system according to the certain embodiments of the invention. In previous returning fuel systems, all pumped fuel is pumped to the fuel rail, with unused fuel returned through a pressure regulator to the fuel tank. A system 60 is shown, having a fuel injected engine 64, fed by a fuel rail 66 and coupled to a fuel tank 62. A second pickup 72 may be seen for drawing in fuel into a fuel supply line, tube, or pipe 74. Fluid supply line 74 may be seen coupled to a first fuel pickup 76. First fuel pickup 76 may be seen coupled to a fuel supply line 78, which in turn is coupled to a fuel pump 80. Fuel pump 80 may be seen feeding a fuel supply line 82, which supplies fuel rail 66. Fuel pump 80 can provide a high pressure to the fuel in fuel rail 66 for fuel injection into engine 64. The unused fuel can have the pressure regulated and let down to a lower fuel pressure by regulator 68. A fuel return line 70 may be seen entering fuel tank 62 and, in this embodiment of the invention, being coupled to second fuel pickup 72. The fuel return line, as the term is used herein, may extend from the fuel rail to the fuel pump, and may have a pressure regulator disposed somewhere in between the fuel injectors and the fuel pump.

As will be discussed in more detail later, where second fuel pickup 72 is closed due to the pickup being exposed to air, fuel is still being supplied to pump 80 through fuel return line 70. Similarly, when first fuel pickup 76 is closed, fuel may be supplied by both second pickup 72 and fuel return line 70. In the event that fuel from both pickups 72 and 76 is temporarily interrupted, as when both pickups are exposed to air, pump 80 will not cavitate or run dry, as fuel return line 70 may be providing fuel to at least temporarily maintain fuel pressure within fuel supply line 82.

Figure 3:
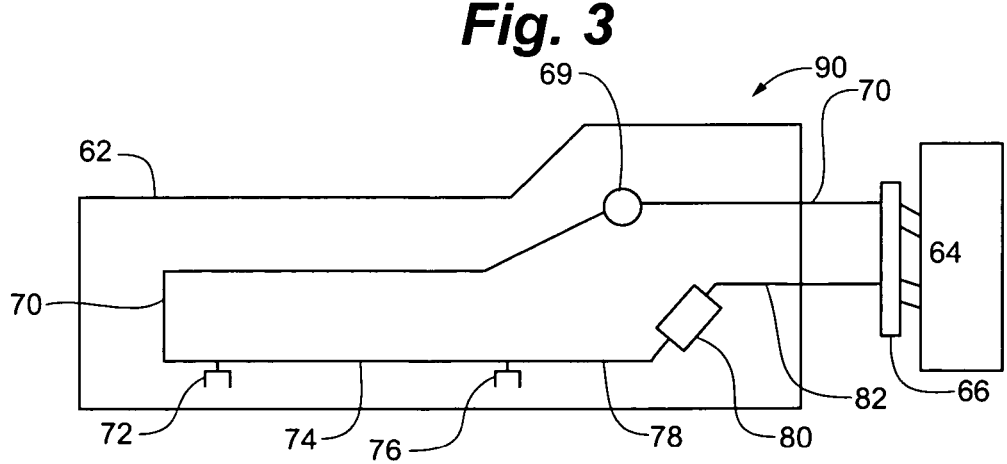
FIG. 3 is a highly diagrammatic view of another returning fuel system having the pressure regulator within the fuel tank and having the fuel return line feeding the second of two fuel pickups in line with the fuel pump.

FIG. 3 illustrates another returning fuel system 90, having many elements similar to that of FIG. 2 and identically numbered. System 90, however, has a pressure regulator 69 disposed within fuel tank 62 rather than external to the fuel tank. In some systems, pump 80 is located external to the fuel tank.

Figure 4:
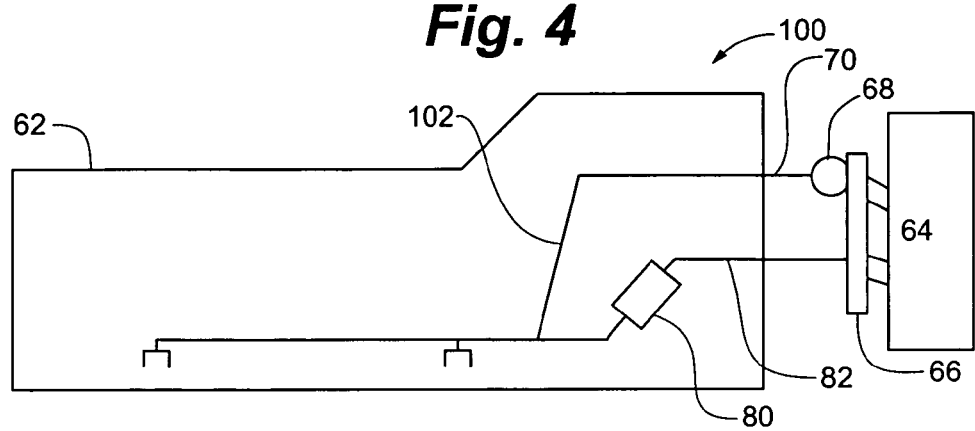
FIG. 4 is a highly diagrammatic view of yet another returning fuel system having the fuel return line feeding a location upstream of the fuel pump but downstream of the first fuel pickup upstream of the fuel pump.

FIG. 4 illustrates a returning fuel system 100, similar to that of FIG. 2 and having the identical elements identically numbered. System 100, however, has fuel return line 70 being coupled to pump 80 through a tube or pipe 102, which is upstream of the pump but downstream of both the fuel pickups.

Figure 5:
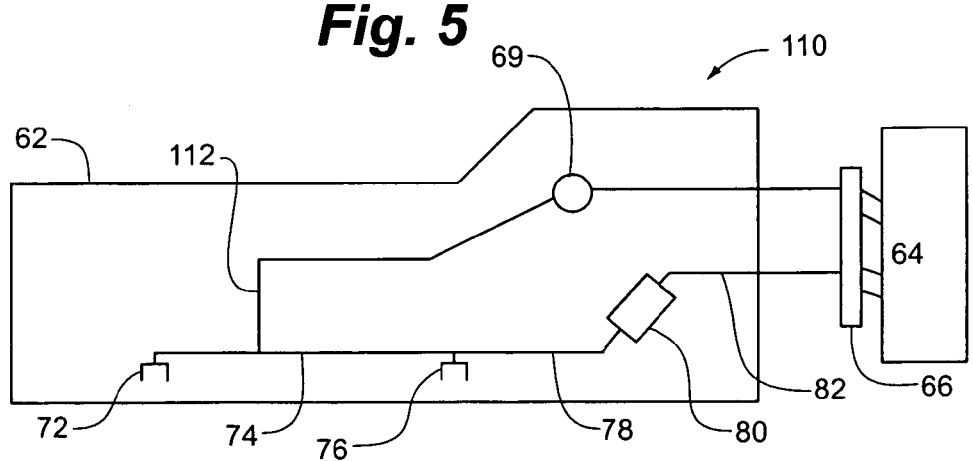
FIG. 5 is a highly diagrammatic view of a returning fuel system having the fuel return line feeding a location between the two fuel pickups.

FIG. 5 illustrates yet another returning fuel system 110, similar to that of FIG. 3, and having identical elements identically numbered. System 110, however, has fuel line 70 recycling fuel through a tube or pipe 112 which feeds the pump 80 by being located downstream of second pickup 72 but upstream of first pickup 76.

Figure 6:
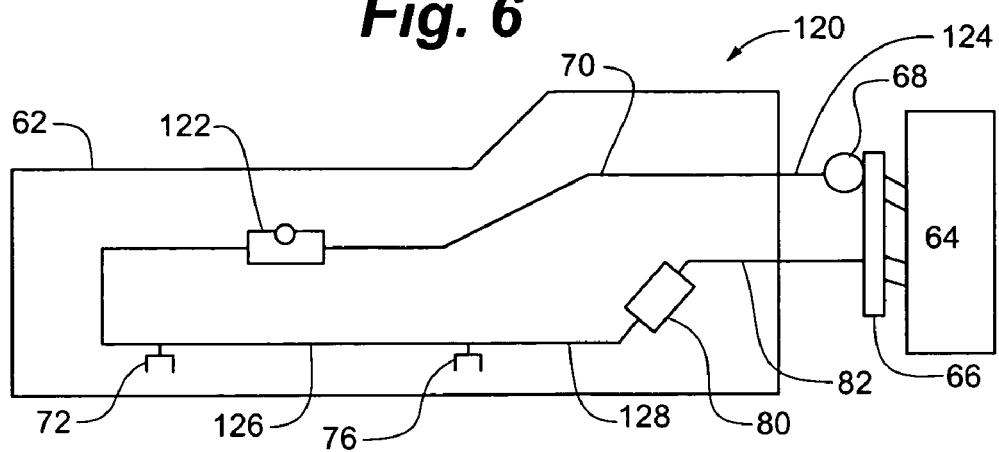
FIG. 6 is a highly diagrammatic view of yet another returning fuel system, similar to the system of FIG. 2, but having a vapor separator interposed in the fuel return line upstream of both fuel pickups.

FIG. 6 illustrates still another returning fuel system 120, similar to that of FIG. 2, and having identical elements identically numbered. System 120, however, has a vapor separator 122, shown disposed or within tank 62 and interposed in fuel return line 70. Vapor separator 122 is shown within the tank, interposed within fuel return line 70, and located upstream of second fuel pickup 72. This is but one embodiment of the invention. Vapor separator 122 can be located at location 124, external to tank 62 but downstream of regulator 68. Vapor separator 122 can also be located at location 126, downstream of second pickup 72 but upstream of first pickup 76. Vapor separator 122 can also be located at location 128, downstream of first pickup 76 but upstream of pump 80. Some systems have a vapor separator located either upstream or downstream of the only fuel pickup.

Figure 7:
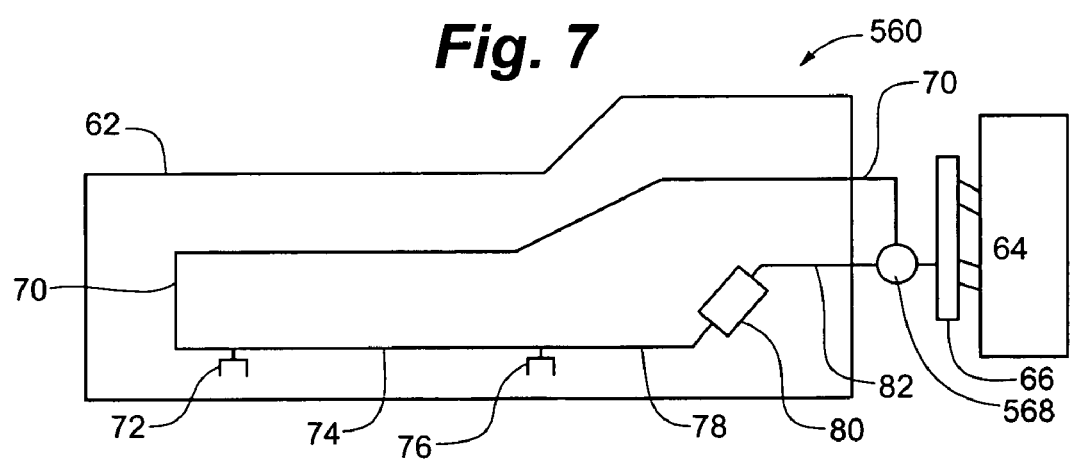
FIG. 7 is a highly diagrammatic view of one dead head fuel system, having a pressure regulator external to the fuel tank and a fuel return line feeding the second of two fuel pickups in line with the fuel pump.

FIG. 7 is a highly diagrammatic view of one dead head fuel system according to certain embodiments of the invention. In previous dead head fuel systems, all pumped fuel goes through a pressure regulator, with the high pressure side of the regulator feeding the fuel injectors and the low side of the regulator returning to the fuel tank. Once fuel enters the fuel rail, it generally remains there until used. A system 560 is shown, similar to the system of FIG. 2 and having similar elements identically numbered. System 560 includes a pressure regulator 568 feeding fuel rail 66 from a high pressure side and feeding fuel return line 70 from the low pressure side of the regulator. Fuel supply line 82 may be considered to pass from the inlet of regulator 568 through to the high pressure side, having pressure regulator 568 thus interposed in fuel supply line 82.

FIG. 8 illustrates another dead head fuel system 590, having many elements similar to that of FIG. 7 and identically numbered. System 590, however, has a pressure regulator 569 disposed within fuel tank 62 rather than external to the fuel tank. In some systems, pump 80 is located external to the tank.

FIG. 9 illustrates a dead head fuel system 600, similar to that of FIG. 7 and having the identical elements identically numbered. System 600, however, has fuel return line 70 being coupled to pump 80 through a tube or pipe 102, which is upstream of the pump but downstream of both the fuel pickups.

Figure 10:
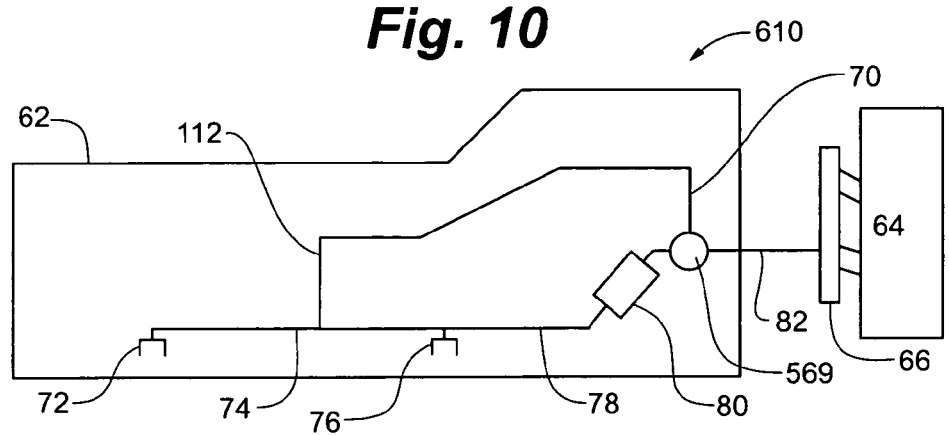
FIG. 10 is a highly diagrammatic view of a dead head fuel system having the fuel return line feeding a location between the two fuel pickups.

FIG. 10 illustrates yet another dead head fuel system 610, similar to that of FIG. 8, and having identical elements identically numbered. System 610, however, has fuel line 70 recycling fuel through a tube or pipe 112 which feeds the pump 80 by being located downstream of second pickup 72 but upstream of first pickup 76.

Figure 11:
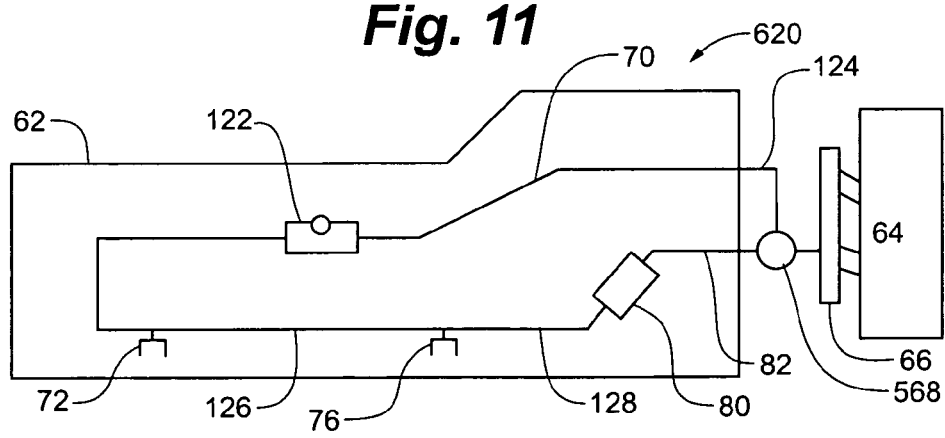
FIG. 11 is a highly diagrammatic view of yet another dead head fuel system, similar to the system of FIG. 7, but having a vapor separator interposed in the fuel return line upstream of both fuel pickups.

FIG. 11 illustrates still another dead head fuel system 620, similar to that of FIGS. 6 and 7, and having identical elements identically numbered. System 620, however, has a vapor separator 122, shown disposed or within tank 62 and interposed in fuel return line 70.

Figure 12A:
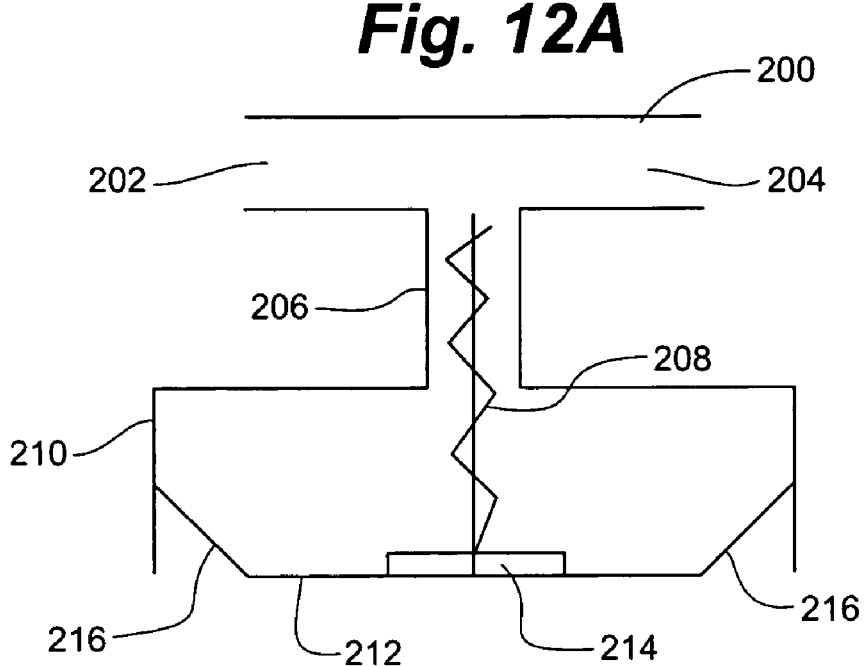
FIG. 12A is a highly diagrammatic view of a fuel pickup in the open position, allowing fuel to flow into the pickup.
Figure 12B:
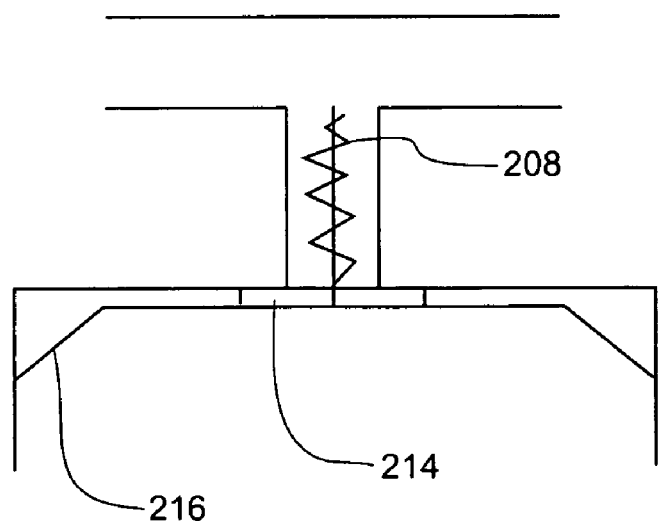
FIG. 12B is a highly diagrammatic view of a fuel pickup, shown in the closed position to preclude fuel flow, as when the fuel pickup is exposed to air.

FIGS. 12A and 12B illustrate one example of a fuel pickup that can work with certain embodiments of the invention. One such fuel pickup is available from Walbro Company. A fuel pickup system 200 is shown, having a "T" fitting having a fuel recycle or supply inlet at 202, a fuel intake at 206, and a fuel outlet at 204. This T arrangement can provide a recycled or return fuel flow through the fuel supply system even when the pickup is closed, or can be coupled in-line to another fuel pickup.

Fuel pickup system 200 includes generally a body 210 and having a membrane or screen having side portions 216 and a center portion 212. A plunger 214 may be seen urged against screen center portion 214, biased by a spring 208. When fluid is present, fluid flows through the permeable screen 212, through fuel intake portion 206, and out fuel outlet portion 204.

FIG. 12B shows the situation where air is present. Screen 212 is relatively impermeable to air, thus, when air is present, screen 212 is drawn up by the fuel pump vacuum, causing plunger 214 to shut off fuel flow through intake portion 206. However, fuel provided from recycle inlet 202 can still proceed through to outlet 204. When fuel is present again, spring 208 will bias screen 212 to return to its original position and fuel can once again flow.

Figure 13:
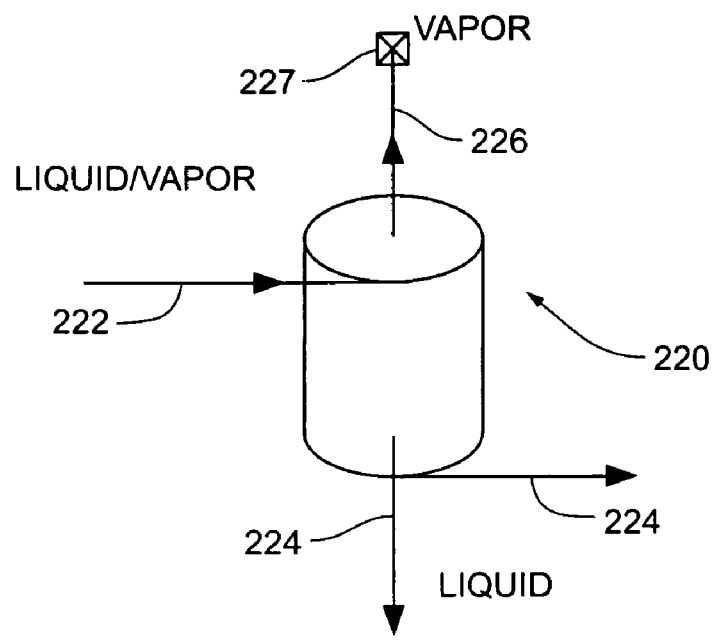
FIG. 13 is a highly diagrammatic view of one centrifugal vapor separator design that can be used in some systems.

FIG. 13 shows one type of centrifugal separator that can be used in certain embodiments of the invention. Separator 220 may be seen having a liquid and vapor inlet 222, a liquid outlet stream 224, and a vapor outlet stream 226, shown here flowing through a one-way check valve 227. Several possible locations are shown for liquid outlet stream 224. In some embodiments, only one liquid outlet stream 224 will be used. However, other embodiments could use multiple outlet streams 224 as represented in FIG. 13.

Figure 14:
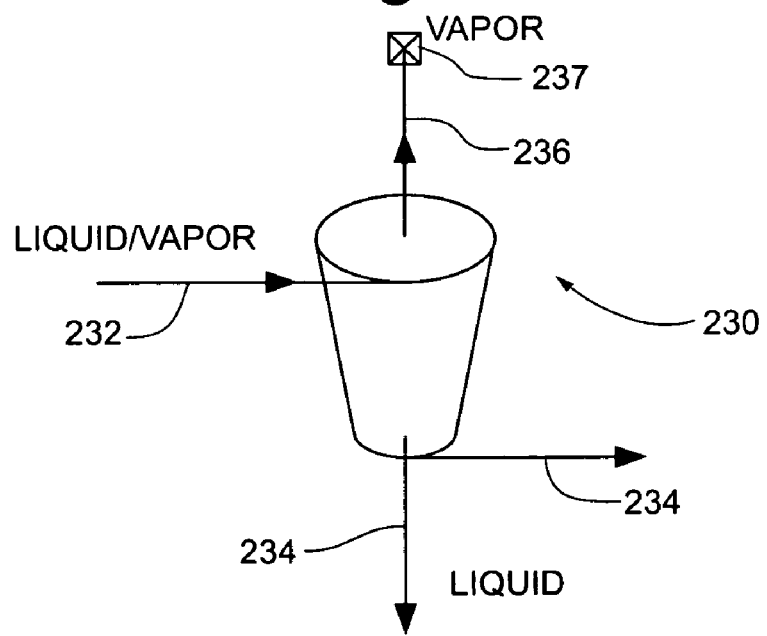
FIG. 14 is a highly diagrammatic view of another centrifugal vapor separator that may be used in some systems.

FIG. 14 shows another centrifugal separator 230, having a liquid/vapor inlet stream 232, a liquid outlet stream 234, and a vapor outlet stream 236, flowing through a one-way check valve 237. Several possible locations are shown for liquid outlet stream 234. In some embodiments, only one liquid outlet stream 234 will be used. However, other embodiments could use multiple outlet streams 234 as represented in FIG. 14.

Figure 15:
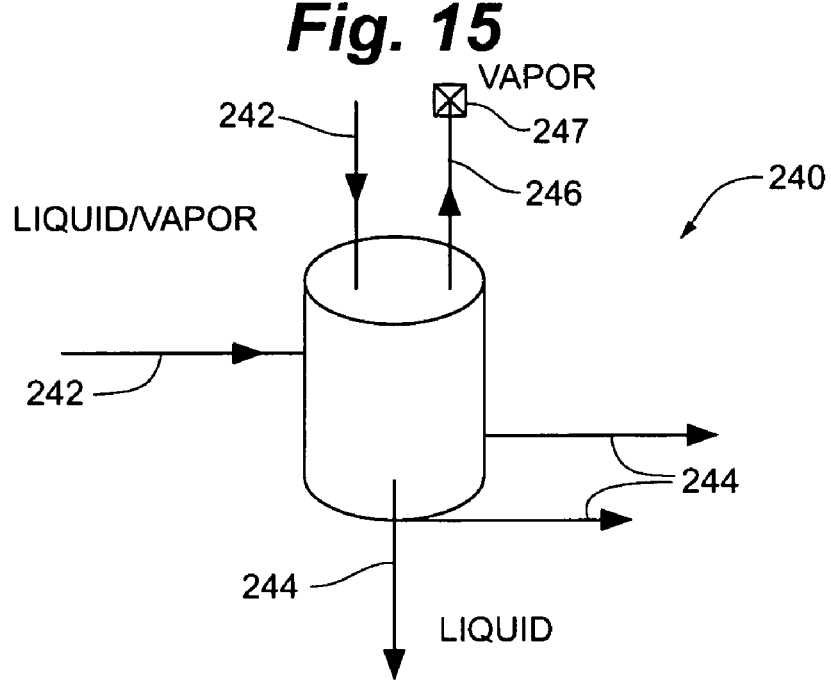
FIG. 15 is a highly diagrammatic view of a "can" vapor separator that may be used in some systems.

FIG. 15 shows a can-type separator 240, having liquid vapor inlet streams 242, liquid outlet streams 244, a vapor outlet stream 246, and check valve 247. Several possible locations are shown for liquid outlet stream 244. In some embodiments, only one liquid outlet stream 244 will be used. However, other embodiments could use multiple outlet streams 244 as represented in FIG. 15.

Figure 16:
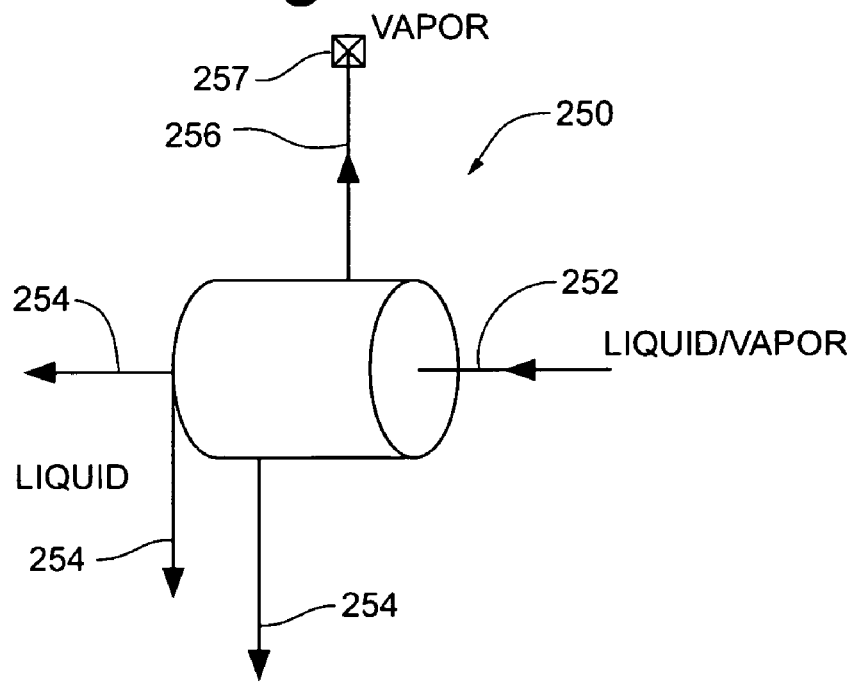
FIG. 16 is a highly diagrammatic view of another "can" vapor separator that may be used in some systems.

FIG. 16 shows another can-type vapor separator 250, having a liquid vapor inlet stream 252, a liquid outlet stream 254, and a vapor outlet stream 256, flowing through check valve 257. Several possible locations are shown for liquid outlet stream 254. In some embodiments, only one liquid outlet stream 254 will be used. However, other embodiments could use multiple outlet streams 254 as represented in FIG. 16.

Figure 17:
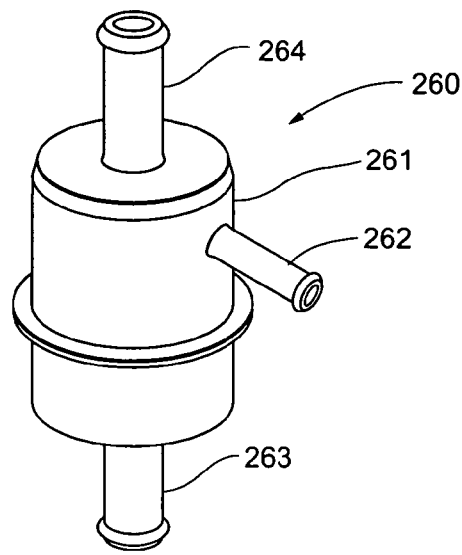
FIG. 17 is a perspective view of a centrifugal type vapor separator that can be used in some systems.

FIG. 17 shows a centrifugal type vapor separator 260, having a housing 261, a liquid vapor inlet stream 262, a liquid outlet stream 263, and a vapor outlet stream 264.

Figure 18:
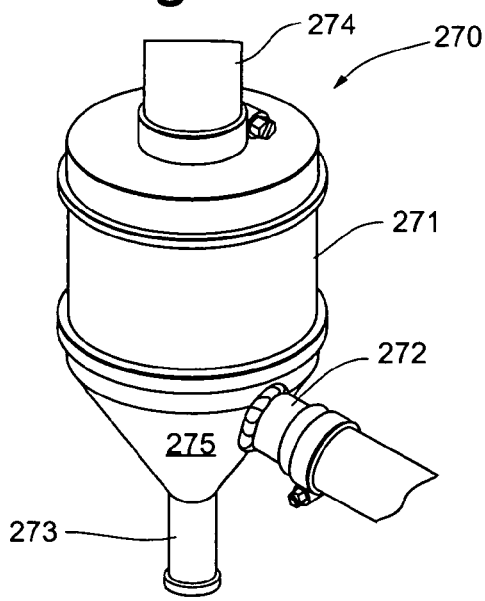
FIG. 18 is a perspective view of a centrifugal type vapor separator that can be used in some systems.

FIG. 18 shows another centrifugal type vapor separator 270, having a housing 271, a funnel shaped bottom 275, a liquid vapor inlet stream 272, a liquid outlet stream 273, and a vapor outlet stream 274.

Figure 19:
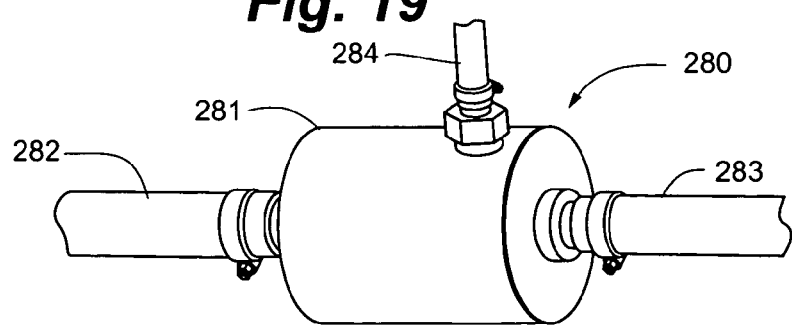
FIG. 19 is a perspective view of a can type vapor separator that can be used in some systems.

FIG. 19 shows a can type vapor separator 280, having a housing 281, a liquid vapor inlet stream 282, a liquid outlet stream 283, and a vapor outlet stream 284.

Vapor separators and the attachments to the separators can be made of material resistant to degradation from the environment of intended use. The vapor outlet may be fitted with a one way valve (a check valve) of some type (e.g. ball, disk, duck bill, etc.) to allow vapor to escape, but prevent unwanted air, vapor, or liquid from entering.

Centrifugal separators can have the mixed liquid and vapor enter tangentially or nearly tangentially to the curved cross-section of a round or rounded cross-section of the separator. The cross section does not have sharp corners in some embodiments. The entrance point can be above the mid-line of the separator as measured along the long axis. Rotation of the liquid-vapor mixture causes separation due to centrifugal acceleration. Once separated, the vapor is removed from the unit through a passage or passages at or near the top. Liquid can be removed through a passage or passages at or near the bottom.

Can-type separators operate by providing a large cross-section for fluid flow relative to the primary flow passages. In this way, the fluid velocity slows sufficiently to allow vapor to rise to the top of the fluid column by the action of gravity. This type of separator can be of any shape that provides large cross-section to slow the fluid velocity. Separators with circular, square, rectangular, triangular, regular and irregular polygons, symmetric and asymmetric cross-sections, as well as spherical shapes and many others can serve as separators. The schematics in the FIGS. 13-19, show shapes as cylinders but the other shapes mentioned are within the scope of the invention. Vapor separators are well known to those skilled in the art, and may be easily made or purchased. Some separators are centrifugal separators, with examples shown in FIGS. 17 and 18.

Figure 20:
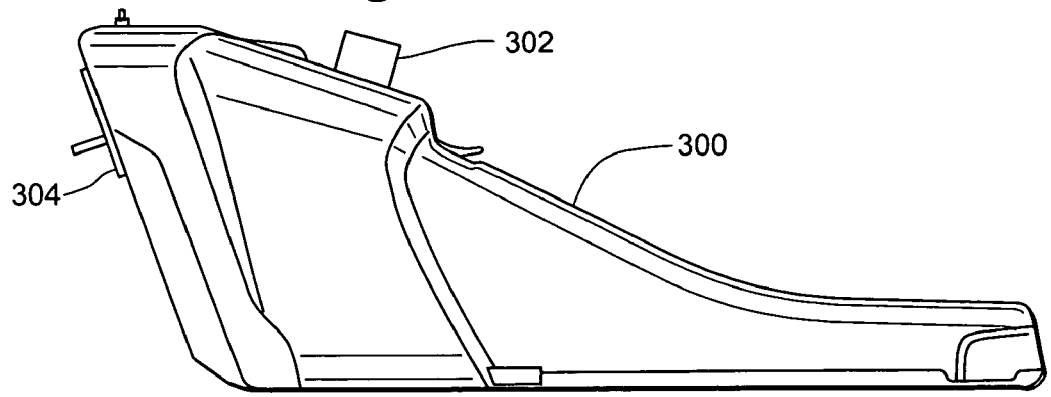
FIG. 20 is a side view of a fuel tank that can be found in some systems.

FIG. 20 shows a fuel tank 300 that can be used with the snowmobile of FIG. 1A. Tank 300 includes generally a filling port 302 and a flange 304. Fuel tank 300 can be disposed near the seat or in another portion of the snowmobile or other off-road vehicle.

Figure 21:
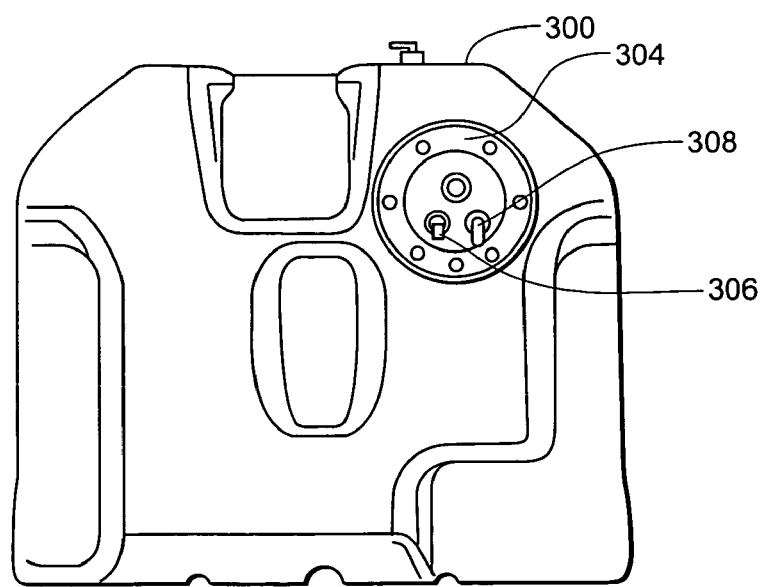
FIG. 21 is a front, end view of the fuel tank of FIG. 20, showing the fuel pump supply and return flange.

FIG. 21 illustrates tank 300 of FIG. 20, from the front. Flange 304 may be seen, including a fuel supply line 306 going to the engine, and a fuel return line 308, returning unused fuel from the fuel rail of the engine.

FIG. 22 illustrates a fuel supply and return system that may be disposed within tank 300 of FIG. 20. Flange 304, supply line 306, and return line 308 may be seen, as discussed with respect to FIG. 21. Returning fluid may enter through flange 304, through return line 308, continue through tubing 309, continue further through tubing 316, until end U-tube 324 is encountered. Second fuel intake 312 may be seen as may first fuel intake 314. These fuel intakes are not coupled to line 316, but are located behind line 316 in this view, and coupled to line 328.

FIG. 23 illustrates a top view of the fuel system of FIG. 22, again having flange 304 and fuel supply line 306. The fuel flow may be seen again, returning in line 316, to U-tube 324, through section 326, to encounter second fuel pickup 312. The fuel pickup T arrangement, as discussed with respect to FIGS. 12A and 12B may be seen, from the top at 322. Fuel picked up from second fuel pickup 312, or from recycle or return line 316, may continue through tubing segment 328 to first fuel pickup 314. First fuel pickup 314 may be seen coupled to the fuel system at a T fitting 322. Fuel from either fuel pickup or from the recycled fuel may continue to fuel pump 310 (better viewed in FIGS. 22 and 24) then out through tubing 320 to fuel outlet tubing 306. The longitudinal separation of the two pickups 312 and 314 at generally opposite longitudinal ends of the tank 300 allows for continuous fuel pickup in off attitude tank conditions.

FIG. 24 illustrates the fuel system of FIGS. 22 and 23, from a front, end view. Flange 304 may be seen as may fuel outlet 306 and fuel return line 308. Identical elements are identically numbered as in FIGS. 22 and 23. A vapor separator, previously discussed, may be inserted in any of the fuel lines of FIGS. 22, 23, or 24, in appropriate locations, as previously discussed.

A vapor separator can find use in several situations, including one particular situation described here. When the engine is running at low RPM the fuel injectors use little fuel. This fuel can be pressurized by the fuel pump, the pressure of unused fuel reduced at the pressure regulator, and the fuel returned to the fuel pump. This cycle can be repeated. Each pressurization can add energy to the fuel, which is not fully removed at the fuel regulator. Fuel vapor can be dissolved in the liquid fuel, with fuel bubbles coming out of solution. When the throttle is suddenly increased, the engine calls for more fuel, pulling more vacuum on the fuel at the pump inlet. There may be very little fuel returning from the pressure regulator at this instant. The fuel near the pump inlet can have a fair amount of fuel vapor present in the form of bubbles. The sudden vacuum pulled can cause the fuel pump to vapor lock. Applicants have learned that placing a vapor separator in the fuel return line can remove vapor that would otherwise go directly to the pump inlet.

Figure 25:
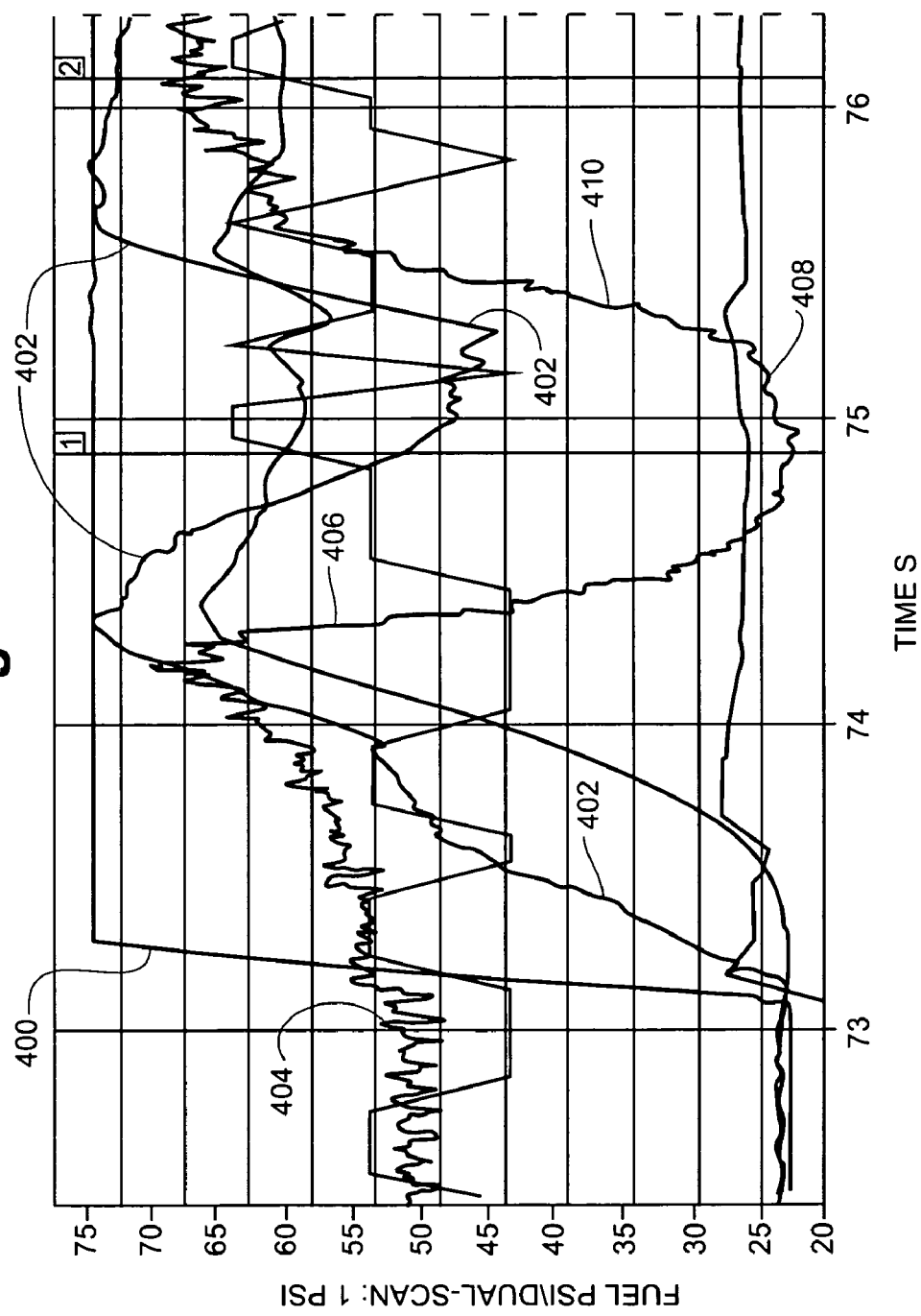
FIG. 25 is an experimental result plot, showing a temporary drop in fuel pressure without a vapor separator in place.

FIG. 25 illustrates an experimental result, showing engine performance when a vapor separator is not in place. The time in seconds is shown along the X axis. The throttle position sensor value or TPS value 400 may be seen, being increased in a step fashion near the left of the graph. The throttle position sensor corresponds to the throttle position sensed when the driver increases the desired throttle position rapidly. Engine RPM may be seen at 402, increasing responsive to a throttle position sensor increase. The rail fuel pressure, shown at 404, (and having a fair amount of variability or noise) may be seen to increase with RPM, but may be seen to fall at location 406, hitting bottom at location 408, then increasing again at location 410. This temporary, nominal 1 or 2 second loss of fuel pressure can cause the engine to sputter.

Figure 26:
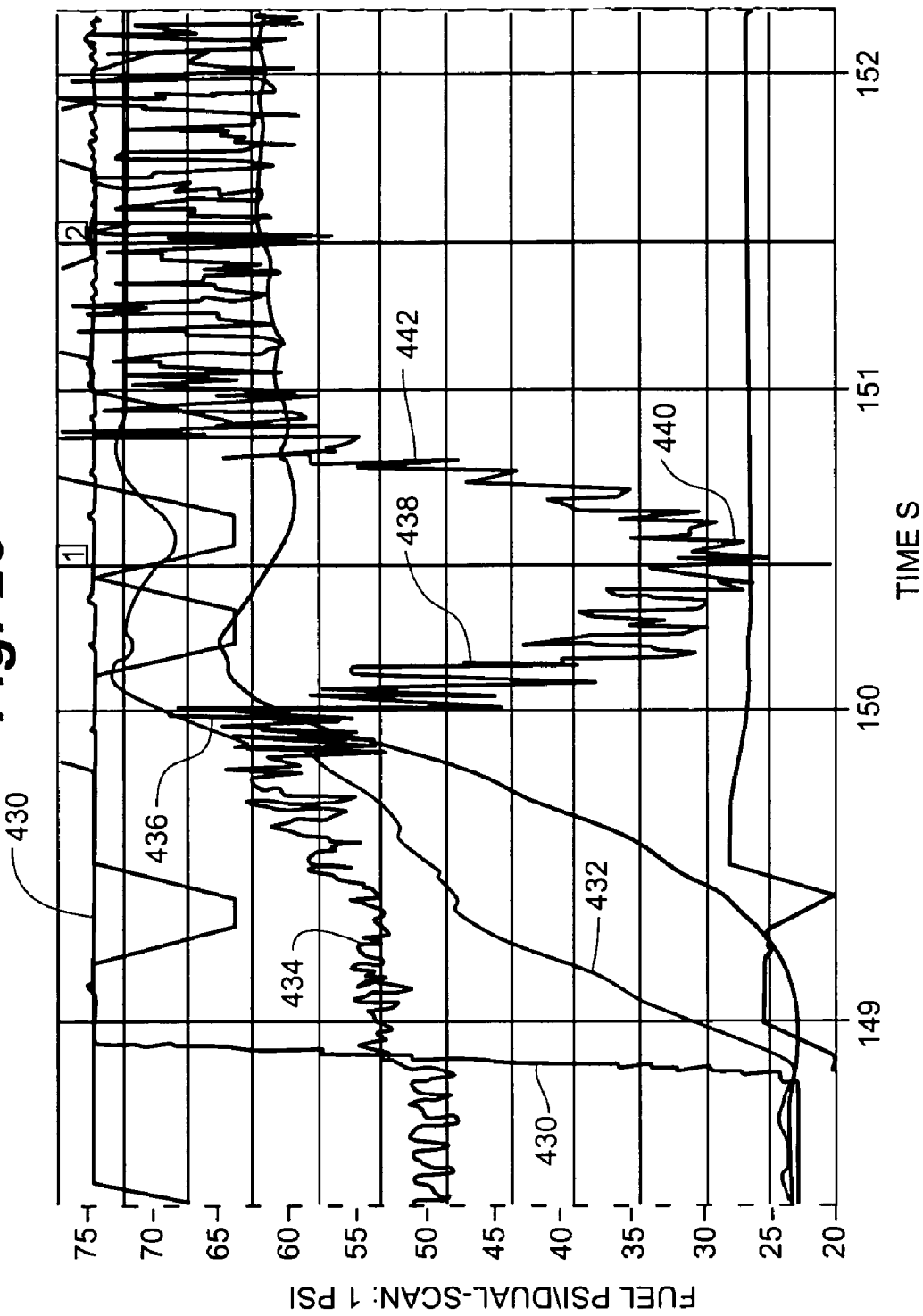
FIG. 26 is another experimental result plot, showing a drop in fuel pressure during acceleration without a vapor separator in place.

FIG. 26 shows another experimental result in an engine not having a vapor separator. Throttle position sensor 430 may be seen increasing again in a stepwise fashion. RPM 432 may be seen, also increasing in response to the TPS increase. Fuel pressure may be seen at 434, increasing to a temporary maximum at 436, decreasing at region 438, hitting bottom at 440, and climbing again in region 442. The nominally 1 or 2 second loss in fuel pressure can again cause the engine to sputter.

Figure 27:
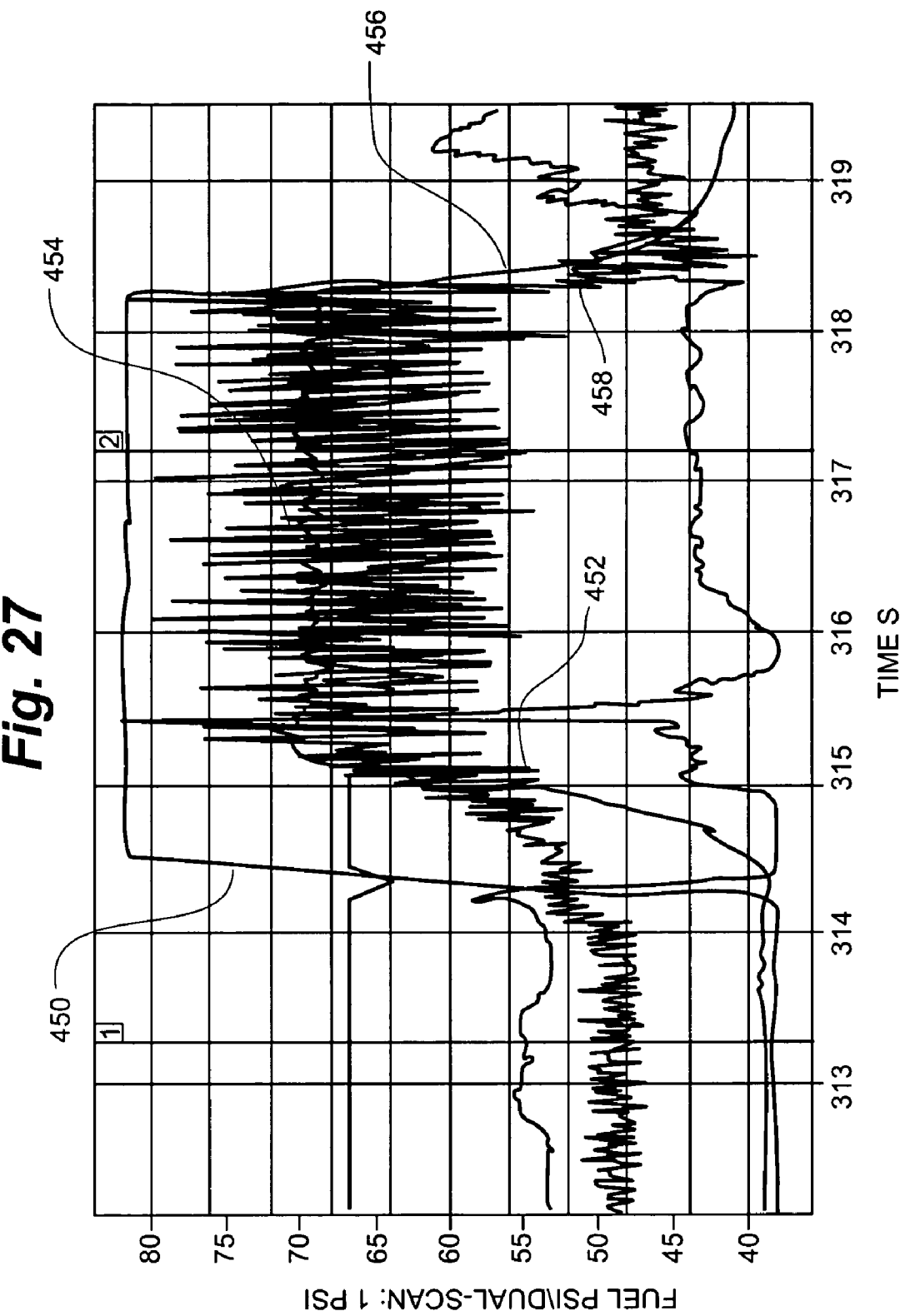
FIG. 27 is an experimental result plot of a system having a vapor separator in place, not showing a drop in fuel pressure during acceleration.

FIG. 27 shows another experimental result, in an engine having a vapor separator. The separator used was constructed from a fuel filter canister. The canister had a cylindrical shape approximately 45 mm in diameter and 75 mm long, resulting in a "can-type" separator, similar to that shown in FIG. 15. Centrifugal separators as shown in FIGS. 13 and 14 were also tested. Each design demonstrated effectiveness in preventing fuel pressure loss under acceleration. The stepwise increase in throttle position sensor may be seen at 450. The response in fuel pressure may be seen climbing at 452, and holding steady in a very noisy region 454. When the throttle position sensor decreases at 456, the fuel pressure may be seen to likewise decrease in region 458.

Thus, embodiments of the fuel pickup return line and separator are disclosed. One skilled in the art will appreciate that the invention can be practiced with embodiments other than those disclosed. The disclosed embodiments are presented for purposes of illustration and not limitation, and the invention is limited only by the claims that follow.

What is claimed is:

1. A snowmobile comprising:
   a chassis;
   a straddle-type seat mounted to the chassis;
   a pair of handlebars carried by the chassis adjacent to the seat configured for steering the snowmobile;
   an endless track carried by a rear suspension system mounted to the chassis;
   a front suspension system mounted to the chassis;
   a fuel injected engine operably coupled to the endless track to drive the endless track;
   a fuel tank;
   at least one fuel pickup disposed in the fuel tank;
   a fuel pump coupled to the at least one fuel pickup;
   a fuel supply line coupled to the fuel pump;
   at least one fuel injector coupled to the fuel supply line downstream of the fuel pump;
   a fuel return line in fluid communication with the at least one fuel injector for returning unused fuel; and
   the fuel return line being in fluid communication with, and upstream of, the fuel pump to supply returned fuel to the fuel pump, the at least one fuel pickup being connected to the fuel return line upstream of the fuel pump.

2. The snowmobile of claim 1, in which the at least one fuel pickup further includes a second fuel pickup disposed upstream of the first fuel pickup and feeding fuel to the first fuel pickup.

3. The snowmobile of claim 1, in which the at least one fuel pickup includes a second fuel pickup for supplying the fuel pump, in which the fuel return line is coupled upstream of the second fuel pickup.

4. The snowmobile of claim 1, further comprising a vapor separator interposed in the fuel return line, for removing at least some vapor from the returning fuel before the fuel returns to the fuel pump.

5. The snowmobile of claim 1, in which the fuel pump is disposed within the fuel tank.

6. The snowmobile of claim 1, in which the fuel pump is disposed external to the fuel tank.

7. The snowmobile of claim 1, in which the at least one fuel pickup is adapted to close in the presence of air and open in the presence of liquid fuel.

8. The snowmobile of claim 1, in which the at least one fuel pickup includes only a single fuel pickup.

9. The snowmobile of claim 1, further comprising a pressure regulator supplied by the fuel pump and having a low pressure side supplying the fuel return line and a high pressure side supplying the fuel injector.

10. The snowmobile of claim 9, in which the pressure regulator is located downstream of the fuel injector.

11. The snowmobile of claim 9, in which the pressure regulator is located upstream of the fuel injector.

12. A system for providing fuel to an off-road vehicle having a fuel injected engine, the system comprising:
    a fuel tank;
    at least one fuel pickup disposed in the fuel tank;
    a fuel pump coupled to the at least one fuel pickup;
    a fuel supply line coupled to the fuel pump;
    at least one fuel injector coupled to the fuel supply line; and
    a fuel return line in fluid communication with the at least one fuel injector for returning fuel, the fuel return line being in fluid communication with the fuel pump to supply returned fuel to the fuel pump, the at least one fuel pickup includes a first fuel pickup for supplying the fuel pump, in which the fuel return line is coupled upstream of the first fuel pickup.

13. The system of claim 12, in which the at least one fuel pickup further includes a second fuel pickup disposed upstream of the first fuel pickup and feeding fuel to the first fuel pickup.

14. The system of claim 12, in which the at least one fuel pickup further includes a second fuel pickup disposed upstream of the first fuel pickup and feeding fuel to the first fuel pickup, in which the fuel return line is coupled up stream upstream of the second fuel pickup.

15. The system of claim 12, in which the at least one fuel pickup further includes a second fuel pickup disposed upstream of the first fuel pickup and feeding fuel to the first fuel pickup, in which the fuel return line is coupled up stream upstream of the first fuel pickup and downstream of the second fuel pickup.

16. The system of claim 12, further comprising a vapor separator interposed in the fuel return line, for removing at least some vapor from the returning fuel.

17. The system of claim 12, in which the fuel pump is disposed within the fuel tank.

18. The system of claim 12, in which the fuel pump is disposed external to the fuel tank.

19. The system of claim 12, in which the at least one fuel pickup is adapted to close in the presence of air and open in the presence of liquid fuel.

20. The system of claim 12, in which the at least one fuel pickup includes only a single fuel pickup.

21. The system of claim 12, further comprising a pressure regulator supplied by the fuel pump and having a low pressure side supplying the fuel return line and a high pressure side supplying the fuel injector.

22. The system of claim 21, in which the pressure regulator is located downstream of the fuel injector.

23. The system of claim 21, in which the pressure regulator is located upstream of the fuel injector.

24. A system for providing fuel to an off-road vehicle having a fuel injected engine, the system comprising:
    means for containing fuel;
    means for drawing in fuel disposed in the means for containing fuel;
    means for pumping fuel coupled to the means for drawing in fuel;

means for supplying fuel to the engine coupled to the fuel pumping means;

means for injecting fuel into the engine coupled to the fuel supply means;

means for returning fuel from the fuel injecting means to the fuel pumping means; wherein the means for returning fuel is in fluid communication with the fuel pumping means to supply returned fuel to the means for supplying fuel; and means for closing the means for drawing in fuel responsive to the presence of air.

25. The system of claim 24, in which the means for returning fuel is coupled downstream of the means for drawing in fuel and upstream of the means for pumping fuel.

26. The system of claim 24, in which the means for returning fuel is coupled upstream of the means for drawing in fuel.

27. The system of claim 24, further comprising means for separating vapor from liquid fuel interposed in the means for returning fuel, in which the means for separating vapor from liquid removes at least some vapor from fuel going to the means for pumping fuel.

28. The system of claim 24, further comprising means for regulating fuel pressure coupled to the fuel pumping means and having a low pressure side for supplying fuel to the fuel pumping means.

29. The system of claim 28, in which the pressure regulating means is located downstream of the fuel injecting means.

30. The system of claim 28, in which the pressure regulating means is located upstream of the fuel injecting means.

\* \* \* \* \*